UNITED STATES PATENT OFFICE.

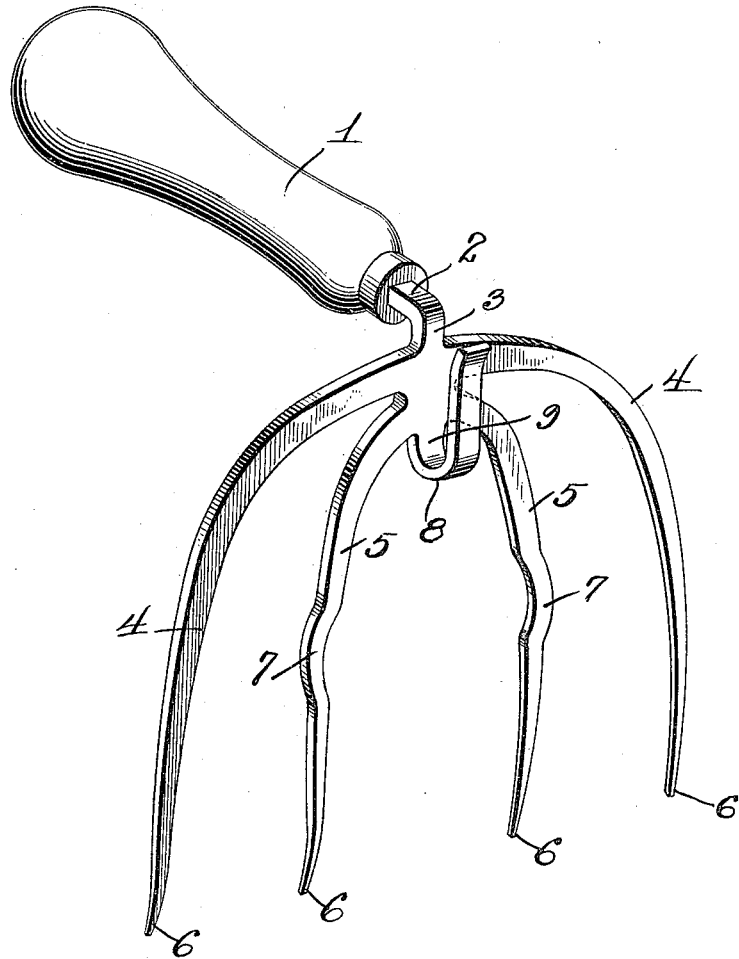

FRANK J. ANDERSON, OF BOX ELDER, MONTANA.

FORK.

1,194,695.   Specification of Letters Patent.   Patented Aug. 15, 1916.

Application filed April 5, 1916. Serial No. 89,164.

*To all whom it may concern:*

Be it known that I, FRANK J. ANDERSON, a citizen of the United States, residing at Box Elder, in the county of Hill and State of Montana, have invented certain new and useful Improvements in Forks, of which the following is a specification.

This invention relates to a grain shocking fork and the primary object is to provide a fork of this character which can be inserted in a bunch or bundle of grain and thereby provide means for lifting or carrying the bundle of grain from one place to another.

The invention further aims to provide a grain shocking fork which will have secured thereto a hook which is designed to be inserted beneath the twine or binding string of the bundle of grain whereby the bundle may be conveniently lifted from the ground.

As a further object of the invention the tines of the fork are provided with bent portions for causing the fork to obtain a surer and tighter grasp upon the bundle of grain when it is to be lifted or carried.

A further object of the invention is the provision of a fork which consists of comparatively few parts and is simple in construction, but durable and well adapted to withstand the rough usage to which devices of this character are ordinarily subjected.

For a full description of the invention and the advantages and merits thereof, reference is to be had to the following description and the accompanying drawing, wherein is illustrated the preferred form of my invention, in which the figure represents a perspective view of the grain shocking fork.

The usual method of harvesting grain is by means of a harvesting binder which ties quantities of the grain together into bunches or bundles. These bunches are left lying in the field by the binder and a number of them are put together into a shock. It is for expeditiously handling these bundles, to bring them together for forming a shock, that this device is constructed. One of these devices is intended to be carried in each hand of the user and it is therefore necessary that a tight and sure hold be obtained on the bundle which is to be carried.

The handle 1 is formed of wood or other suitable material and is designed to conveniently fit the hand of the user. The handle is mounted upon the tongue 2 which is bent at right angles to the portion to which the handle is secured to provide a depending portion 3 which has integrally formed therewith and extending therefrom the end tines 4 and the intermediate or central tines 5. The free ends 6 of the tines are disposed in spaced relation to each other and they all terminate in the same horizontal plane. It will be observed that the tines 4 are curved from their ends which are formed integrally with the tongue 2 and thereby form a substantially inverted U-shaped fork while the tines 5 are similarly formed to provide a substantially U-shaped fork which is smaller in its design and scope. The ends of the tines however, are integrally formed together and extend from substantially the same meeting point at the end of the portion 3 of the tongue 2. Each of the tines 5 is provided at about its center with a curved or bent portion 7 which is designed to cause the tines 5 to more securely hold themselves in the bundle of grain when the tines are thrust through the bundle, and thereby prevent the tines from being easily or accidentally withdrawn when the bundle is being carried from one place to another. A strip of metal 8 is integrally formed at the meeting point of the ends of the tines and is positioned between the tines 5 and is upwardly bent to form a hook 9 which is adapted to be inserted beneath the twine or binding string of the bunch or bundle of grain whereby the same may be carried from one place to another if this method of carrying is desired. It will be understood that in some cases the bundle of grain is loosely tied by the binder and the hook therefore may be employed to carry the bundle in the event of the failure of the tines to take a firm hold in the bundle of grain. When the hook is employed to lift the bundle it will be seen that the bundle will press or rest against the tines of the fork and, the handle being disposed at right angles to the tines, will allow the user to hold the bundle in an upright vertical position for stacking the same when forming a shock.

From the foregoing it will be observed that a very simple and durable fork has been provided, the details of which embody the preferred form. I desire it to be understood however, that slight changes or modifications in the minor details of construction may be made without departing from the spirit of the invention or the scope of the claims hereunto appended.

I claim:

1. A device of the character described including a tongue having a handle mounted thereon, a plurality of tines formed on said tongue and extending at right angles thereto, and means for forming a lifting element integrally formed with said tines at a point at which they join each other in a common center, said tines radiating from said common center and arranged in spaced relation at their terminals, the said tines which are embraced by the extreme outer tines being provided with bent portions intermediate their ends.

2. A device of the character described including a tongue, a plurality of tines integrally formed with said tongue and extending at right angles thereto, said tines arranged to provide a pair of U-shaped members, one large and the other small, said smaller U-shaped member being provided with bent portions intermediate its ends.

3. A device of the character described including a tongue, an inverted U-shaped member, a smaller U-shaped member, a hook, the end of said tongue and the vertexes of said U-shaped members and the shank of said hook being all connected together at a common center, the said smaller U-shaped member being provided with bent portions intermediate the ends of the tines forming said smaller U-shaped member.

4. A device of the character described including a tongue having a handle mounted thereon, said tongue bent at right angles near one end, a plurality of tines formed on said tongue, some of said tines having a bend formed intermediate their ends, and a hook formed of a strip of metal connected to the meeting ends of said tines.

5. A device of the character described including a tongue having a handle mounted thereon, said tongue having its end bent at right angles to the end which holds the handle, an inverted U-shaped member having its center secured to said tongue, a similar smaller U-shaped member having its center secured to the center of said first mentioned U-shaped member, the arms of said smaller U-shaped member having bent portions provided therein, and a hook integrally formed with and extending from the center of said smaller U-shaped member.

In testimony whereof I affix my signature in presence of two witnesses.

FRANK J. ANDERSON.

Witnesses:
FRANK H. MASON,
EDNA E. SPRAGUE.

Copies of this patent may be obtained for five cents each, by addressing the "Commissioner of Patents, Washington, D. C."